United States Patent Office 2,825,719
Patented Mar. 4, 1958

2,825,719

COPOLYMERIZATION OF VINYL ETHERS

Karl Herrle and Hans Fikentscher, Ludwigshafen (Rhine), and Hans Peter Siebel, Ludwigshafen (Rhine), Oppau, Germany, assignors to Badische Anilin- & Soda-Fabrik Aktiengesellschaft, Ludwigshafen, Germany No Drawing. Application August 10, 1954
Serial No. 449,004

Claims priority, application Germany August 11, 1953

15 Claims. (Cl. 260—80.3)

This invention relates to new copolymers of vinyl ethers and to a process for the production of these copolymers. More particularly this invention deals with copolymers of vinyl ether having only one polymerizable olefinic double linkage with unsaturated ether which contains a vinyl ether and also allyl ether group.

It is already known that vinyl allyl ether can be polymerized in such a way that only the vinyl groups are reacted. For this purpose the polymerization catalysts used are iodine or metal or non-metal halides which are capable of forming ansolvo acids. The oily to resinous polymers obtained, which still contain substantially all the allyl groups in unchanged form, may be hardened by the action of air just like drying oils. For many purposes, however, these hardened polymers of vinyl allyl ether are unsuitable by reason of their brittleness.

We have now found that industrially valuable copolymers can be prepared by copolymerizing mixtures of 20 to 99.9% by weight of a vinyl ether with only one polymerizable olefinic double linkage and 80 to 0.1% by weight of an unsaturated ether which contains a vinyl ether group and an allyl ether group, in the presence of a catalyst which is capable of initiating a cationic ion chain polymerization.

Among simple vinyl ethers having only one olefinic double linkage there may be used for the process vinyl alkyl ethers, such as vinyl methyl ether, vinyl ethyl ether, vinyl-n-propyl ether, vinyl isopropyl ether, vinyl-n-butyl ether, vinyl isobutyl ether, vinyl dodecyl ether, vinyl octodecyl ether, and also vinyl cycloalkyl ethers, such as vinyl cyclohexyl ether and vinyl decahydronaphthyl ether (i. e. the vinyl ether of decahydronaphthol), or vinyl aryl ethers, such as vinyl phenyl ether, or vinyl aralkyl ethers, such as vinyl benzyl ether.

Vinyl allyl ether is of special interest for copolymerization with the said simple vinyl ethers. There may, however, also be used for example vinyl-2-methylallyl ether and vinyl crotonyl ether and also ethers of polyhydric alcohols which contain not only a vinyl group but also an allyl group. Such ethers are for example the vinyl allyl ethers of ethylene glycol or higher glycols. More than two monomers may also be used for the copolymerization.

Among polymerization catalysts which initiate cationic chain polymerizations, acid aluminum sulfate (the preparation of which is described in U. S. patent specification No. 2,549,921) is especially important. A highly active aluminum sulfate is obtained by treating commercial aluminum sulfate $(Al(SO_4)_3 \cdot 18H_2O)$ with sulfuric acid. The active component of the catalyst is aluminum hexahydrosulfate of the formula $Al_2(SO_4)_3 \cdot 3H_2SO_4 \cdot 7H_2O$. With this catalyst, copolymers of high molecular weight can be prepared even at room temperature and at moderately decreased temperatures, as for example between $-20°$ C. and $+20°$ C. Other suitable catalysts are for example Friedel-Crafts' catalysts, such as boron fluoride, aluminum chloride, aluminum bromide, titanium tetrachloride, tin tetrachloride and the addition products of these halides with water, ethers or other organic oxygen-containing compounds. The polymerization temperatures usually lie between about $-110°$ C. and $+100°$ C. For other details relating to the polymerization with cationic catalysts see C. E. Schildknecht, Vinyl and Related Polymers, John Wiley & Sons, Inc., New York, 540–542 (1952).

Copolymers having different degrees of polymerization are obtained depending on the polymerization conditions. Thus at low temperatures the products obtained usually high a higher K-value than those at higher temperatures. The K-value may be varied within wide limits and may lie for example between 10 and 150. The K-value is a parameter denoting the molecular size of the polymer (see H. Fikentscher, Cellulosechemie 13, 58 (1932)).

The polymerization can be carried out in bulk or in the presence of solvents or diluents and may be continuous or discontinuous. Polymerization in a solvent offers the advantage that heat can be withdrawn better. Suitable solvents are for example hydrocarbons, halogenated hydrocarbons and ethers.

The polymers formed are colorless to brown substances which constitute oily, rubberlike to resinous masses depending on the degree of polymerization and the monomers used. They dissolve in organic solvents and contain double linkages which originate from unpolymerized allyl groups and which can be detected in the usual way, e. g. by titration with iodine monochloride. The fact that the number of double linkages in the copolymers largely corresponds to the percentage of the component containing the allyl group warrants the conclusion that the allyl groups do not participate or, at least, do not substantially participate in the polymerization reaction. It is to their content of double linkages that the said new kind of copolymers owe their reactivity; they can be crosslinked by sulfur and other usual vulcanization agents, by molecular oxygen or by the action of peroxidic catalysts.

The copolymers have different properties depending on the proportion of the different monomers. Copolymers which have been produced from mixtures with a content of 90 to 99.9%, preferably 97 to 99%, by weight of simple vinyl ethers are especially of interest for working up into rubberlike masses. In the vulcanized state they have properties similar to those of the copolymers of isobutylene and small amounts of dienes known as "butyl rubber." The said copolymers can be pressed and extruded. They may be mixed with fillers, such as carbon black, graphite and talc, and with softeners, such as phthalic acid esters, and also with soluble dyestuffs and organic or inorganic pigments. To increase the stability of the polymers to light, heat and oxygen, about 0.1 to 2% of a stabilizer may be added thereto. Such stabilizers are for example phenyl-beta-naphthylamine or di-(para-tertiary-butylphenol)-sulfide. The usual accelerators may be added during the vulcanization.

Copolymers which contain a high proportion of vinyl allyl ether or its homologues and smaller amounts of simple vinyl ethers are valuable raw materials for lacquers and may be worked up in a similar way as drying oils. For the production of such lacquer raw materials it is preferable to copolymerize mixtures containing 20 to 80, preferably 40 to 60% by weight of simple vinyl ethers. The crosslinking of such copolymers is effected as a rule by oxidation with atmospheric oxygen, it being advantageous to add oxidation accelerators, such as cobalt naphthenate. These copolymers may be combined with other lacquer raw materials, as for example with drying oils or polyester resins. They form films which are insoluble in organic solvents and unsaponifiable after they have been hardened out.

The following examples will further illustrate this invention but the invention is not restricted to these examples. The parts are parts by weight.

Example 1

90 parts of vinyl ethyl ether, 10 parts of vinyl allyl ether and 100 parts of petroleum ether are introduced into a vessel provided with a stirrer and a condenser. The said substances have been previously purified by fractional distillation. The temperature of the mixture is brought to +5° C. by external cooling. There is then added, as catalyst, 0.02 part of an acid aluminum sulfate which has been prepared by heating an intimate mixture of 20 grams of $Al_2(SO_4)_3 \cdot 18H_2O$ and 6.6 grams of concentrated sulfuric acid for 4 hours at 150° C. While the increase in viscosity allows the prosecution of the slowly initiated reaction, the temperature is kept at +5° C. When the reaction solution has become converted into a gelatinous state, the temperature is allowed to rise slowly so that reflux commences at the well-cooled reflux condenser. The end of the polymerization reaction is detected by the fall in temperature in the reaction mass. 1 part of a 5% solution of ammonia in methanol is added to destroy the catalyst. The solvent is evaporated in vacuo at 50° C. The yield is 90%.

A rubberlike copolymer of pale yellow color is obtained which has a K-value of 100.

Assuming that the allyl groups have not participated in the polymerization reaction the content of vinyl allyl ether in the copolymer determined by titration with iodine monochloride is 9.3% by weight.

Example 2

95 parts of vinyl ethyl ether, 5 parts of vinyl allyl ether and 200 parts of pentane, all of which have been purified by distillation and drying, are introduced into a vessel provided with a stirrer and a condenser. Before 0.1 part of the catalyst used in Example 1 is added, the temperature of the mixture is brought to 0° C. by external cooling. This temperature is maintained until the reaction mass is converted into a gelatinous state. The temperature is then allowed to rise to the boiling point of the mixture. Before the reaction has completely subsided, 0.5 part of di-(para-tertiary-butylphenol)-sulfide, dissolved in 10 parts of pentane, is allowed to run in for the purpose of stabilization. The pentane is driven off by heating the product to 100° C. The yield is 92%.

The pale yellow, rubberlike, non-sticky product has a K-value of 110. The titration with iodine monochloride indicates a content of vinyl allyl ether of 4.5% by weight.

Example 3

A mixture of 98 parts of a vinyl ethyl ether which has been purified as much as possible by repeated fractionation, 2 parts of a similarly purified vinyl allyl ether and 150 parts of a purified petroleum ether is introduced into a reaction vessel provided with a stirrer and a reflux condenser. The temperature of the mixture is brought to −10° C. 0.01 part of the acid aluminum sulfate used in Example 1 is added as polymerization catalyst. The slow reaction can be observed by the increase in viscosity. When the reaction mass has become highly viscous, the temperature is allowed to rise up to the boiling point and 0.5 part of phenyl naphthylamine is added as a stabilizer. The product is heated to 50° C. in vacuo to remove the petroleum ether.

The rubberlike reaction product which is almost colorless and retains its shape, has a K-value of 140. (Content of vinyl allyl ether 2.0% by weight by titration with iodine monochloride.)

100 parts of this copolymer are mixed on rollers with the following ingredients:

40 parts of active carbon black
5 parts of stearic acid
5 parts of zinc oxide
3 parts of sulfur and
3 parts of a mixture of tetramethyl thiuram disulfide and mercaptobenzthiazole.

After heating the mixture for an hour at 150° C., a mass similar to vulcanized rubber is obtained which has the following properties:

Strength: 135 kilograms per square centimeter
Modulus: 45 kilograms per square centimeter
Extension: 692%
Shore hardness: 65.

Example 4

A mixture of 95 parts of vinyl normal-butyl ether, 5 parts of vinyl allyl ether and 100 parts of petroleum ether is introduced into a reaction vessel provided with a stirrer and a reflux condenser. The mixture is cooled to +10° C. and 0.05 part of the acid aluminum sulfate prepared according to Example 1 is added. As soon as the reaction mass has acquired a high viscosity, the temperature is allowed to rise up to the boiling point of the petroleum ether. The petroleum ether is removed by evaporation in vacuo at 40° to 50° C. after the polymerization.

A brown colored, elastic rubberlike mass having the K-value 100 is obtained.

Example 5

A mixture of 90 parts of vinyl ethyl ether, 10 parts of vinyl normal butyl ether, 2 parts of vinyl allyl ether and 100 parts of petroleum ether is introduced into a reaction vessel provided with a stirrer and a condenser. The mixture is cooled to 5° C. and 0.05 part of the acid aluminum sulfate used in Example 1 is added. While the solution becomes more viscous during the progress of the reaction, the temperature is kept at +6° to +10° C. When the viscous solution begins to change to the gelatinous state, the temperature is raised to boiling point. The polymerization product is stabilized by the addition of 0.2 part of di-(para-tertiary-butyl-phenol)-sulfide. The petroleum ether is distilled off in vacuo. An elastic, rubberlike, non-sticky polymer having a K-value of 125 is obtained.

Example 6

0.6 part of a 1% solution of boron fluoride dihydrate in dioxane is added to a mixture of 50 parts of vinyl allyl ether and 50 parts of vinyl isobutyl ether at 40° C. The polymerization begins immediately. After subsidence of the first reaction, there is added during the course of an hour another 0.6 part of a 1% solution of boron fluoride dihydrate in dioxane and polymerization is continued for half an hour.

An almost transparent polymer similar to soft resin is obtained which has a K-value of 28 and which is soluble in a large number of solvents. Its solutions yield films which harden in the air without embrittling.

Example 7

A mixture of 20 parts of vinyl allyl ether and 80 parts of vinyl isobutyl ether is polymerized as in Example 6. The polymer may be worked up like a drying oil and yields elastic films especially when siccatives are added.

Example 8

A mixture of 50 parts of vinyl allyl ether and 50 parts of decalyl vinyl ether is polymerized at 40° C. in the presence of 2 parts of a 1% solution of boron fluoride in dioxane.

A resin having the K-value 24 is obtained which is suitable for the production of lacquers.

Example 9

A mixture of 50 parts of vinyl ethyl ether and 50 parts of vinyl allyl ether is polymerized as in Example 6. 2 parts of benzoyl peroxide are added to the copolymer and it is heated in a nitrogen atmosphere slowly from 80° to 120° C. during the course of 4 hours. A transparent mass is obtained which is insoluble in organic solvents.

Example 10

A mixture of 20 parts of vinyl allyl ether and 80 parts of vinyl isobutyl ether is polymerized as in Example 6. 2 parts of benzoyl peroxide and 2 parts of tertiary butyl peroxide are added to the copolymer and it is slowly heated from 60° to 140° C. in a nitrogen atmosphere during the course of 4 hours. A transparent film is obtained which is insoluble in organic solvents.

Example 11

A mixture of 72 parts of vinyl ethyl ether, 1.3 parts of vinyl allyl ether of ethylene glycol, 250 parts of petroleum ether and 0.3 part of di-(para-tertiary-butylphenol)-sulfide is cooled to −5° C. in a reaction vessel provided with a stirrer and a cooler. The reaction is initiated by adding 0.1 part of the catalyst described in Example 1. The reaction mixture is kept at below 0° C. by external cooling. The end of the reaction is recognized by the fall of the temperature of the reaction mixture to the temperature of the external cooling. The petroleum ether is sucked off in vacuo.

An elastic, non-sticky, colorless polymer having a K-value of 125 is obtained. (Content of the vinyl allyl ether of ethylene glycol 1.7% by weight, determined by titration with iodine monochloride.) The product can be vulcanized in the manner described in Example 3 to give a mass similar to vulcanized rubber.

Example 12

A mixture of 86 parts of vinyl normal-propyl ether, 2.2 parts of vinyl allyl ether of ethylene glycol, 250 parts of petroleum ether and 0.3 part of di-(para-tertiary-butylphenol)-sulfide is introduced into a reaction vessel fitted with a stirrer and cooler. The polymerization is carried out with the same catalyst and with the same procedure as in Example 11.

A colorless, elastic product having the K-value 115 is obtained. (Content of the vinyl allyl ether of ethylene glycol 2.6% by weight, determined by titration with iodine monochloride.)

Example 13

A reactor fitted with a stirrer mechanism and a reflux condenser system is charged with a mixture of 435 parts of vinyl methyl ether, 6.3 parts of vinyl allyl ether, 800 parts of benzene and 280 parts of petroleum ether. Then, at a temperature of 8° C., 0.25 part of the acid aluminum sulfate prepared by the method described in Example 1 is added. When the low-speed polymerization is complete, the polymerization product is neutralized by the addition of a 5 percent solution of ammonia in methanol. The solvents are removed by evaporation at between 40° and 50 °C. in vacuo. The faintly colored product obtained, having a K-value of 70, has good dimensional stability. (Content of vinyl allyl ether 1.5% by weight, determined by titration with iodine monochloride.) By curing this product with carbon black and vulcanizing assistants as indicated in Example 3, a vulcanizate having a high stability to hydrocarbons of the petroleum series is obtained.

Example 14

Gaseous boron fluoride is led into a mixture of 25 parts of vinyl isobutyl ether, 1 part of vinyl allyl ether and 100 parts of liquid propane, when polymerization occurs in a few seconds taking a speedy and violent course with the evaporation of propane. When all of the propane has been vaporized, the product is washed with low-percent ammonical water and dried. The product obtained is a colorless, elastic, non-tacky polymer of high dimensional stability which can be cured by the standard method. (Content of vinyl allyl ether 3.5% by weight, determined by titration with iodine monochloride.)

Example 15

A reactor fitted with a stirring mechanism and a reflux condenser system is charged with a mixture of 160 parts of vinyl methyl ether and 42 parts of vinyl allyl ether and to this mixture, while maintaining a temperature of 5° C., 0.8 part of a 2 percent diethyl ether solution of the boron fluoride-diethyl ether adduct is added. The reaction which starts after the addition of the catalyst, is so controlled by cooling that the temperature does not exceed 40° C. The product obtained is a clear, colorless and tacky polymer having a K-value of 29. Films made thereof are liable to after-hardening in the air.

Example 16

A mixture of 50 parts of vinyl allyl ether, 50 parts of vinyl cyclohexyl ether and 200 parts of methylene chloride is polymerized by the addition of 0.5 part of aluminum chloride dissolved in some methylene chloride. The temperature is controlled to not exceed 30° C. The polymerization completed, the catalyst is neutralized by the addition of ammonia and the solvent is evaporated. The resin obtained, having a K-value of 31, is a high quality varnish base.

We claim:

1. A copolymer of 97 to 99.9% by weight of a vinyl ether having a single polymerizable olefinic linkage and of 3 to 0.1% by weight of an unsaturated ether which contains a vinyl ether group and also an allyl ether group, the allyl groups of said copolymer being substantially unpolymerized.

2. A copolymer of 97 to 99.9% by weight of a vinyl ether having a single polymerizable olefinic linkage and of 3 to 0.1% by weight of vinyl allyl ether, the allyl groups of said copolymer being substantially unpolymerized.

3. A copolymer of 97 to 99.9% by weight of a vinyl ether of a saturated aliphatic monoalcohol containing in the radicle of the saturated aliphatic monoalcohol from 1 to 18 carbon atoms and of 3 to 0.1% by weight of vinyl allyl ether, the allyl groups of said copolymer being substantially unpolymerized.

4. A copolymer as claimed in claim 3 wherein the vinyl ether of the saturated aliphatic monoalcohol is vinyl methyl ether.

5. A copolymer as claimed in claim 3 wherein the vinyl ether of the saturated aliphatic monoalcohol is vinyl ethyl ether.

6. A copolymer as claimed in claim 3 wherein the vinyl ether of the saturated aliphatic monoalcohol is vinyl propyl ether.

7. A copolymer as claimed in claim 3 wherein the vinyl ether of the saturated aliphatic monoalcohol is vinyl n-butyl ether.

8. A copolymer as claimed in claim 3 wherein the vinyl ether of the saturated aliphatic monoalcohol is vinyl isobutyl ether.

9. A copolymer of 97 to 99.9% by weight of a vinyl ether of a saturated cycloaliphatic monoalcohol and of 3 to 0.1% by weight of vinyl allyl ether, the allyl groups of said copolymer being substantially unpolymerized.

10. A copolymer as claimed in claim 9 wherein the vinyl ether of the saturated cycloaliphatic monoalcohol is cyclohexyl vinyl ether.

11. A copolymer as claimed in claim 9 wherein the vinyl ether of the saturated cycloaliphatic monoalcohol is decahydronaphthol vinyl ether.

12. A copolymer of 97 to 99.9% by weight of a vinyl ether having a single polymerizable olefinic linkage and of 3 to 0.1% by weight of the vinyl allyl ether of ethylene glycol, the allyl groups of said copolymer being substantially unpolymerized.

13. A copolymer as claimed in claim 12 wherein the vinyl ether containing only one polymerizable olefinic double linkage is vinyl ethyl ether.

14. A copolymer as claimed in claim 12 wherein the vinyl ether containing only one polymerizable olefinic double linkage is vinyl propyl ether.

15. A vulcanized copolymer of 97 to 99.9% by weight of a vinyl ether having a single polymerizable olefinic linkage and of 3 to 0.1% by weight of an unsaturated ether which contains a vinyl ether group and also an allyl ether group, the allyl groups of said copolymer being substantially unpolymerized but being cross-linked by vulcanization.

References Cited in the file of this patent

UNITED STATES PATENTS

| | | |
|---|---|---|
| 2,265,640 | Garvey | Dec. 9, 1941 |
| 2,318,959 | Muskat et al. | May 11, 1943 |
| 2,518,321 | Hoover | Aug. 8, 1950 |

FOREIGN PATENTS

| | | |
|---|---|---|
| 645,067 | Great Britain | Oct. 25, 1950 |